United States Patent
Hasz et al.

(10) Patent No.: US 6,302,318 B1
(45) Date of Patent: Oct. 16, 2001

(54) METHOD OF PROVIDING WEAR-RESISTANT COATINGS, AND RELATED ARTICLES

(75) Inventors: Wayne Charles Hasz, Pownal, VT (US); Anthony Mark Thompson, Niskayuna; Marcus Preston Borom, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/343,987

(22) Filed: Jun. 29, 1999

(51) Int. Cl.⁷ .............................. B23K 31/02; B05D 5/00; B21D 33/00
(52) U.S. Cl. .................. 228/254; 228/261; 427/123; 427/124; 427/156; 29/17.2
(58) Field of Search ................................ 228/261, 121, 228/122.1, 254, 119, 125; 427/123, 124, 142, 154, 156; 29/17.2, 889.1, 402.11, 402.13, 402.09

(56) References Cited

U.S. PATENT DOCUMENTS

| | | |
|---|---|---|
| 3,779,720 * | 12/1973 | Ellis et al. . |
| 3,864,093 * | 2/1975 | Wolfla . |
| 3,886,637 * | 6/1975 | Ellis et al. . |
| 3,896,244 * | 7/1975 | Ellis et al. . |
| 4,095,005 * | 6/1978 | Kishida et al. . |
| 4,116,723 | 9/1978 | Gell et al. . |
| 4,325,754 | 4/1982 | Mizuhara et al. . |
| 4,450,205 * | 5/1984 | Itaba et al. . |
| 4,557,778 * | 12/1985 | Held . |
| 4,600,599 * | 7/1986 | Wallsten . |
| 4,741,286 | 5/1988 | Itoh et al. . |
| 5,047,612 | 9/1991 | Savkar et al. . |
| 5,078,837 * | 1/1992 | Descamp et al. . |
| 5,288,551 * | 2/1994 | Sato et al. . |
| 5,332,598 | 7/1994 | Kawasaki et al. . |
| 5,399,313 | 3/1995 | Ross et al. . |
| 5,505,498 * | 4/1996 | Halling et al. . |
| 5,518,683 * | 5/1996 | Taylor et al. . |
| 5,523,169 | 6/1996 | Rafferty et al. . |
| 5,682,596 * | 10/1997 | Taylor et al. . |
| 5,789,077 | 8/1998 | Nakahama et al. . |
| 5,956,845 * | 9/1999 | Arnold . |
| 6,036,995 * | 3/2000 | Kircher et al. . |
| 6,049,978 * | 4/2000 | Arnold . |

* cited by examiner

*Primary Examiner*—Tom Dunn
*Assistant Examiner*—Kiley Stoner
(74) *Attorney, Agent, or Firm*—Donald S. Ingraham; Douglas E. Stoner

(57) ABSTRACT

A method for applying a wear coating on a surface of a substrate is described. A foil of the wear coating is first attached to the substrate surface, and then fused to the surface, e.g., by brazing. The wear coating may be formed from a carbide-type material. The substrate is very often a superalloy material, e.g., a component of a turbine engine. A method for repairing a worn or damaged wear coating applied over a substrate is also described, along with related articles of manufacture.

14 Claims, No Drawings

METHOD OF PROVIDING WEAR-RESISTANT COATINGS, AND RELATED ARTICLES

BACKGROUND OF THE INVENTION

This invention relates to articles which require wear-resistance, such as components used in turbine engines. In some specific embodiments, it relates to improved techniques for applying such coatings to surfaces that are difficult to access.

Components are used in a wide variety of industrial applications, under a diverse set of operating conditions. In many cases, the components are provided with coatings which impart various characteristics, such as corrosion resistance, heat resistance, oxidation resistance, and wear resistance. As an example, the various components of turbine engines are often coated with thermal barrier coatings, to effectively increase the temperature at which they can operate.

The wear-resistant coatings (often referred to as "Wear coatings") are frequently used on turbine engine components, such as nozzle wear pads and dovetail interlocks. The coatings provide protection in areas where components may rub against each other, since the rubbing—especially high frequency rubbing—can erode the part. Various coatings may be used for this purpose, e.g., chromium carbide or cobalt-molybdenum-chromium-silicon coatings. The coatings are usually applied by thermal spray techniques, such as air plasma spray (APS), high velocity oxy-fuel (HVOF), and vacuum plasma spray (VPS).

The thermal spray techniques are quite suitable for applying wear coatings to many substrates. However, they are sometimes not effective for applying the coatings to regions of a substrate which are somewhat inaccessible, since the spray equipment may be too large and cumbersome for such regions. For example, it can be very difficult to thermally spray a wear coating on a flange or other surface of a turbine engine part. Moreover, the spray process, which may include one or more masking steps, is sometimes very time-consuming. Thus, new methods for efficiently applying wear coatings to inaccessible regions of a substrate would be welcome in the art.

SUMMARY OF THE INVENTION

One embodiment of this invention is a method for applying a wear coating on a surface of a substrate, comprising the following steps:

(a) attaching a foil which comprises the wear coating material to the substrate surface, and then (b) fusing the foil to the substrate surface, so that the wear coating material adheres to the substrate.

The foil is often prepared by thermally spraying the wear coating material onto a removable support sheet. Exemplary thermal spray techniques are high velocity oxy-fuel and air plasma spray. The foil is then separated from the support sheet, prior to being fused to the substrate. The fusing step is usually carried out by brazing. The substrate is very often a superalloy material. This substrate can be a component of a turbine engine.

Examples of wear coating materials are chromium carbide and cobalt-molybdenum-chromium-silicon coatings. The disclosed methods greatly enhance the application of wear coatings to areas which are often inaccessible or difficult to coat by conventional deposition techniques.

A method for repairing a worn or damaged wear coating applied over a substrate is also described. The method comprises the following steps:

(i) removing the worn or damaged wear coating from a selected area on the substrate;

(ii) attaching a foil which comprises the wear coating material to the substrate surface, covering the selected area; and then (iii) fusing the foil to the substrate, so that the wear coating material adheres to the selected area on the substrate.

Related articles are also described. They include a substrate, such as a turbine engine component, and a foil of the wear coating material disposed over the substrate. In preferred embodiments, the foil is fused to the substrate by a braze layer, to provide the wear coating in the desired location.

Further details regarding the various features of this invention are found in the remainder of the specification.

DETAILED DESCRIPTION OF THE INVENTION

A variety of materials, including but not limited to metals or metal alloys, can be used as the substrate for the present invention. The term "metal-based" in reference to substrates disclosed herein refers to those which are primarily formed of metal or metal alloys, but which may also include some non-metallic components, e.g., ceramics, intermetallic phases, or intermediate phases. The substrate can be a heat-resistant alloy, such as a superalloy, which typically has an operating temperature of up to about 1000–1150° C. The term "superalloy" is usually intended to embrace iron-, cobalt-, or nickel-based alloys, which include one or more other elements such as aluminum, tungsten, molybdenum, titanium, and iron. Superalloys are described in various references, such as U.S. Pat. Nos. 5,399,313 and 4,116,723, both incorporated herein by reference. High temperature alloys are also generally described in Kirk-Othmer's *Encyclopedia of Chemical Technology*, 3rd Edition, Vol. 12, pp. 417–479 (1980), and Vol. 15, pp. 787–800 (1981). Illustrative nickel-base superalloys are designated by the trade names Inconel®, Nimonic®, Rene® (e.g., Rene® 80-, Rene® 95 alloys), and Udimet®. The type of substrate can vary widely, but it is often in the form of an engine part, such as a turbine nozzle.

The metal foil is formed from a material suitable for wear resistance. These types of materials are known in the art, and are usually in powder form. Non-limiting examples include chromium carbide or Group 5a carbides of vanadium, niobium, or tantalum. Cobalt-molybdenum-chromium-silicon wear coatings may also be used. Some of these materials are commercially designated as T800 coatings. Other wear coating materials are also possible, such as hafnium carbide (HfC), zirconium carbide (ZrC), manganese carbide (MnC), iron carbide (FeC), nickel carbide (NiC), cobalt carbide (CoC), silicon carbide (SiC), tungsten carbide (WC), molybdenum carbide (MoC), titanium carbide (TiC), and boron carbide (BC). Mixtures which contain any of these materials may also be employed, e.g., chromium carbide—nickel chromium coatings. Furthermore, cermets made by combining one or more of the carbides with nickel, chromium or cobalt, or with a combination of any of these metals, may also be used.

The wear coating foil can be made by a variety of techniques. For example, wear coating powder can be deposited onto a removable support sheet (usually metallic) as a thin layer of metal, such as about 25 microns to about 1300 microns (after surface finishing, (e.g., grinding), and preferably, from about 100 microns to about 750 microns in thickness. In some embodiments, the support sheet is actually a removable substrate, such as a replica or duplicate of the "final substrate" requiring the wear coating. As described below, various techniques can be used to subsequently detach the foil from the support sheet.

Various thermal spray techniques are usually employed for the deposition of the wear coating powder onto the support sheet. Examples include vacuum plasma spray (VPS), high velocity oxygen fuel (HVOF), or air plasma spray (APS). Other deposition techniques could be used as well, such as sputtering, physical vapor deposition (PVD) or electron beam physical vapor deposition (EBPVD). As one specific illustration, HVOF techniques are known in the art and described, for example, in U.S. Pat. Nos. 5,508,097 and 5,527,591, both incorporated herein by reference. HVOF is a continuous combustion process in which the powder is injected into the jet stream of a spray gun at very high speeds. Those of ordinary skill in the art are familiar with various HVOF details, such as the selection of primary gasses, secondary gasses (if used), and cooling gasses; gas flow rates; power levels; coating particle size, and the like.

As another illustration, plasma spray techniques are also known in the art and described, for example, in the Kirk-Othmer *Encyclopedia of Chemical Technology*, 3rd Edition, Vol. 15, page 255, and references noted therein. U.S. Pat. Nos. 5,332,598; 5,047,612; and 4,741,286 are also instructive in regard to various aspects of plasma spraying, and are incorporated herein by reference. In general, the typical plasma spray techniques involve the formation of a high-temperature plasma, which produces a thermal plume. The coating material, in the form of a powder, is fed into the plume. The powder particles melt in the plasma and are accelerated toward the substrate being coated. If the process is carried out in an air environment, it is often referred to as APS. Those of ordinary skill in the plasma spray coating art are familiar with various details which are relevant to applying the coating, e.g., plasma spray parameters such as spray distances (gun-to-substrate); selection of the number of spray-passes; powder feed rate, torch power, plasma gas selection; and the like.

Information regarding the other deposition techniques (e.g., vacuum plasma deposition, sputtering, PVD, and the like) is also readily available. Those of skill in the art will be able to select particular operating conditions for using each of these techniques to deposit a foil of the wear coating material on the support sheet.

The support sheet is then removed, leaving the desired metal foil. Several different techniques can be used to remove the foil from the support sheet. For example, if the support sheet is intentionally not grit-blasted prior to deposition of the coating metal, adhesion of the metal to the support sheet will be relatively low, permitting easy detachment of the foil. Alternatively, a release coating can be applied to the removable support sheet prior to application of the wear coating material. Suitable release coatings are known in the art. As still another alternative, an etchable coating such as aluminum can be applied to the removable support sheet prior to application of the wear coating material. After the wear coating material is applied, the coated support sheet can be treated in a bath of a solution which selectively etches the aluminum, such as aqueous potassium hydroxide. Removal of the aluminum layer results in detachment of the foil from the removable support sheet.

In some instances, the substrate surface to which the foil will be attached is very curved or somewhat irregular. In such a case, it may be desirable to provide the foil with a substantially identical shape. Relatively thin foils may be somewhat flexible, and can be bent to some degree to match the curvature of a substrate. Foils of greater thickness usually are not flexible, but can be shaped by other techniques. For example, the removable support sheet discussed above could initially be provided with the desired curvature of the substrate, prior to deposition of the coating material. If a replica of the final substrate is used as the support sheet, it would already have the desired shape and curvature.

Detachment of the removable support sheet results in a freestanding foil of the wear coating material. The foil can then be cut to a size appropriate for the site on the substrate where the coating is desired, prior to being fused to the substrate. Various techniques can be used to temporarily hold the foil in place, prior to fusing. For example, an adhesive could be used, i.e., one which completely volatilizes during the fusing step. Alternatively, the foil could be bolted, clamped, or tack-welded into place.

The fusing step can be carried out by various techniques. Very often, it is a brazing step, and is similar to any conventional brazing operation. As used herein, "brazing" is generally meant to include any method of joining materials that involves the use of a filler material, metal or alloy. One exemplary reference for details regarding brazing is the text *Modern Metalworking*, by J. R. Walker, The Goodheart-Willcox Co., Inc., 1965, pp. 29-1 to 30-24.

A variety of braze alloy compositions may be used for the present invention. Some of them are described in the Kirk-Othmer *Encyclopedia of Chemical Technology*, 3rd Edition, Vol. 21, pages 342 et seq. If the substrate is a nickel-base superalloy, the braze alloy usually contains at least about 40% by weight nickel. (Nickel-containing braze alloys or cobalt-containing braze alloys are usually used with cobalt-base superalloys). The braze alloy composition may also contain silicon and/or boron, which serve as melting point suppressants.

It should be noted that other types of braze alloys may be used, e.g., precious metal compositions containing silver, gold, and/or palladium, in combination with other metals, such as copper, manganese, nickel, chrome, silicon, and boron. Mixtures which include at least one of the braze alloy elements are also possible.

Various techniques for applying the braze alloy can be employed. For example, the braze alloy composition can be applied to the removable support sheet, prior to application of the wear coating composition. Various thermal spray techniques can be used to apply the braze composition to the removable support sheet, such as HVOF and APS. Other techniques can also be used, such as sputtering or PVD. When the removable support sheet is detached, the braze layer will remain attached to the underside of the wear coating layer (i.e., forming a bi-layer), for fusing to the final substrate. In those instances in which an etchable coating is employed (as discussed above), the braze composition would be applied after the etchable coating is deposited. The solution employed to attack the etchable coating should be one which will not adversely affect the braze composition or the wear coating composition.

In an alternative technique for applying the braze alloy, a freestanding braze foil could be employed. Methods for making such braze foils are known in the art. Moreover, the braze foils are commercially available from various sources, such as Wesgo and Allied Signal Company. The braze foil can be tack-welded to the substrate, or an adhesive can be used. The wear coating foil can then be tack-welded or adhesively attached to the braze foil. Alternatively, the braze foil can first be attached to the wear coating foil, followed by the attachment of the joined foils to the substrate.

As still another alternative, a green braze tape could be used to attach the wear coating foil to the substrate. Such tapes are well known in the art, and are commercially available, e.g., the Amdry™ line of tapes from Sulzer-METCO, Inc. They can be obtained with an adhesive on one or both sides, so that the tape can be initially attached to either the substrate or the wear coating foil.

As another alternative, the braze material can be utilized in the form of a slurry, which usually contains metal powder, binder, and optionally, solvent. A variety of binder materials may be used, e.g., water-based organic materials such as polyethylene oxide and various acrylics, or solvent-based binders. Conventional details related to the mixing of the slurry are described in various references, such as U.S. Pat. No. 4,325,754, which is incorporated herein by reference. Slurry compositions are also commercially available. Use of the braze slurry compositions is advantageous in various situations. For example, when the final substrate surface is irregular, or contains pits or crevices, the braze slurry can be used to fill such regions.

The braze slurry can be applied to the desired region of the final substrate, prior to placement of the wear coating foil over the braze slurry. Various techniques are available for applying the braze slurry composition. For example, it can be sprayed, painted, or tapecast onto the final substrate. Alternatively, the braze slurry composition can be applied to the surface region of the foil which will contact the desired region of the substrate. In fact, the braze slurry composition could be applied to both the wear coating foil and the substrate region which will be in contact with the foil.

Those of ordinary skill in the art are familiar with other details regarding brazing. Brazing temperatures depend in part on the type of braze alloy used, and are typically in the range of about 525° C. to about 1650° C. In the case of nickel-based braze alloys, braze temperatures are usually in the range of about 800° C. to about 1260° C. When possible, brazing is often carried out in a vacuum furnace. The amount of vacuum will depend in part on the composition of the braze alloy. Usually, the vacuum will be in the range of about $10^{-1}$ torr to about $10^{-8}$ torr.

If the wear coating is to be applied to an area which does not lend itself to the use of a furnace (e.g., when the component itself is too large to be inserted into a furnace), a torch or other localized heating means can be used. For example, a torch with an argon cover shield or flux could be directed at the brazing surface. Specific, illustrative types of heating techniques for this purpose include the use of gas welding torches (e.g., oxy-acetylene, oxy-hydrogen, air-acetylene, air-hydrogen); RF welding; TIG (tungsten inert-gas) welding; electron-beam welding; resistance welding; and the use of IR lamps. As described above, green braze materials usually contain organic binders which are volatile. Care should be taken when using these types of heating techniques with the green brazes, to avoid the undesirable effects of outgassing. For example, the heating step could be carried out very gradually. Moreover, one could select green tape compositions which have low volatile content.

As mentioned previously, the fusing step can be carried out by techniques other than brazing. For example, a torch or other heating technique (e.g., the welding techniques mentioned above) can be used for fusing the wear coating foil to the substrate, as an alternative to the vacuum furnace. Regardless of what fusing technique is employed, the resulting wear coating layer is metallurgically bonded to the substrate, and exhibits the properties of wear coatings applied by prior art techniques.

The described method can minimize or do away with time-consuming steps often found in prior art processes. For example, masking steps that are usually required when coating selected substrates (or regions of a substrate) within a component can be eliminated. Instead, the coating is formed "off-line", and can be cut to precise dimensions and then brazed to the selected substrate region. In many instances, the brazing step can be advantageously carried out during another heating step normally carried out in the process. (Braze alloys having melting temperatures similar to temperatures used in another heating step could be selected).

When a preexisting wear coating becomes worn or damaged, it must be carefully repaired, to prevent erosion of the underlying substrate. In the case of a turbine engine component, for example, it may be necessary to repair the coating while the turbine is in service, i.e., after its delivery from the manufacturing site. The process disclosed herein provides a means for rapidly repairing or replacing selected areas of an existing wear coating, without having to completely remove the coating. The process is especially useful for repairing coatings which are situated in areas not easily accessible to other repair techniques. Thus, the present invention is also directed to a method for repairing a worn or damaged wear coating applied over a substrate, comprising the following steps:

(i) removing the worn or damaged wear coating from a selected area on the substrate;

(ii) attaching a foil which comprises the wear coating material to the substrate surface, covering the selected area; and then (iii) fusing the foil to the substrate, so that the wear coating material adheres to the selected area on the substrate.

The fusing step in this embodiment is often carried out by using a torch or other portable heating apparatus. The various wear coatings have been described previously, e.g., chromium carbide, cobalt-molybdenum-chromium-silicon, and the like.

Another aspect of this invention is directed to an article which comprises a foil of wear coating material fused to a metal-based substrate. The substrate can be formed of various materials, such as superalloys, and is often in the form of a turbine engine component. The foil is usually fused to the substrate by an intervening braze layer, as described above. The braze layer usually has a thickness of about 2.5 microns to about 125 microns, and is usually no greater than about 25 microns. As those skilled in the art recognize, there may be a relatively small amount of diffusion or migration of the braze layer material into the substrate or into the wear coating foil, e.g., migration into the pores of a wear foil formed by APS. The wear coating foil usually has a thickness in the range of about 25 microns to about 1300 microns, and preferably, in the range of about 100 microns to about 750 microns, after surface finishing. When the foil is fused to the substrate, it functions as a wear coating which protects a designated portion of the substrate, as described previously.

Some of the preferred embodiments have been set forth in this disclosure for the purpose of illustration. However, the foregoing description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A method for applying a wear coating on a surface of a substrate, comprising:
   (a) forming a foil by deposition of the wear coating onto a removable support sheet;
   (b) separating said foil from said removable support sheet;
   (c) attaching said foil to said substrate surface; and
   (d) fusing said foil to said substrate surface, so that the wear coating adheres to the substrate.

2. The method of claim 1, wherein the deposition of said foil onto said removable support sheet is accomplished by thermal spraying.

3. The method of claim 2, wherein thermal spraying is carried out by a technique selected from the group consisting of vacuum plasma deposition, high velocity oxy-fuel, and air plasma spray.

4. The method of claim 1, wherein the foil is fused to the substrate surface by a brazing or welding technique.

5. The method of claim 4, wherein the brazing technique is carried out in a vacuum.

6. The method of claim 4, wherein the brazing technique is carried out by applying a slurry of the braze composition to a surface of the foil, attaching the foil to the substrate surface so that the braze composition is in contact with the substrate surface, and then exposing the braze composition to a suitable brazing temperature.

7. The method of claim 4, wherein the brazing technique is carried out by applying a slurry of the braze composition to the substrate surface; then attaching the foil to the substrate surface so that the foil is in contact with the braze composition; and then exposing the braze composition to a suitable brazing temperature.

8. The method of claim 4, wherein the foil is fused to the substrate surface by a technique which comprises the following steps:
   (I) applying a layer of braze alloy material to a removable support sheet;
   (II) thermally spraying the wear coating material over the layer of braze alloy material, to form a bi-layer of braze alloy and wear coating foil;
   (III) separating the bi-layer from the removable support sheet;
   (IV) attaching the bi-layer to the substrate surface so that braze alloy material is in contact with the substrate surface; and then
   (V) exposing the braze composition to a suitable brazing temperature.

9. The method of claim 4, wherein the brazing technique is carried out by attaching the wear coating foil to the substrate surface with a green braze tape, and then exposing the green braze tape to a suitable brazing temperature.

10. The method of claim 1, wherein the wear coating material is selected from the group consisting of chromium carbide, vanadium carbide, niobium carbide, tantalum carbide, hafnium carbide, zirconium carbide, manganese carbide, iron carbide, nickel carbide, cobalt carbide, silicon carbide, tungsten carbide, molybdenum carbide, titanium carbide, boron carbide, cobalt-molybdenum-chromium-silicon; and combinations thereof.

11. The method of claim 1, wherein the thickness of the foil is in the range of about 25 microns to about 1300 microns.

12. The method of claim 1, wherein the metal-based substrate is a superalloy.

13. The method of claim 12, wherein the superalloy is nickel-based.

14. The method of claim 1, wherein the substrate is a component of a turbine engine.

* * * * *